US012607239B2

(12) United States Patent
Hogg

(10) Patent No.: US 12,607,239 B2
(45) Date of Patent: Apr. 21, 2026

(54) AIRCRAFT LANDING GEAR ASSEMBLY

(71) Applicant: Airbus Operations Limited, Bristol (GB)

(72) Inventor: Kevin Hogg, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 553 days.

(21) Appl. No.: 18/105,622

(22) Filed: Feb. 3, 2023

(65) Prior Publication Data

US 2023/0258238 A1 Aug. 17, 2023

(30) Foreign Application Priority Data

Feb. 17, 2022 (GB) ...................................... 2202151

(51) Int. Cl.
*F16D 65/00* (2006.01)
*B64C 25/42* (2006.01)
(52) U.S. Cl.
CPC .......... *F16D 65/0031* (2013.01); *B64C 25/42* (2013.01)
(58) Field of Classification Search
CPC ...................... F16D 65/0031; B64C 25/42–48
See application file for complete search history.

(56) References Cited

U.S. PATENT DOCUMENTS

2011/0214568 A1 * 9/2011 Krantz ................ F16D 65/0031
55/385.3

FOREIGN PATENT DOCUMENTS

| DE | 102018207295 A1 * | 11/2019 | ......... F16D 65/0031 |
| DE | 10 2019 133 794 | 6/2021 | |
| EP | 3 667 114 | 6/2020 | |
| GB | 943472 | 12/1963 | |
| GB | 2 515 063 | 12/2014 | |
| JP | 6-109045 | 4/1994 | |

OTHER PUBLICATIONS

European Search Report cited in EP23156731.4 mailed Jun. 16, 2023, 8 pages.
Combined Search and Examination Report for GB Application No. 2202151.3 dated Jul. 8, 2022, 6 pages.

* cited by examiner

*Primary Examiner* — David R Morris
(74) *Attorney, Agent, or Firm* — Nixon & Vanderhye P.C.

(57) ABSTRACT

An aircraft landing gear assembly 1 includes a wheel 10, a disc brake 20 comprising one or more discs 21, 22 and a filter 30. The disc brake is operable to inhibit rotation of wheel 10 during a braking event thereby resulting in the formation of brake dust from the one or more discs 21, 22. The filter 30 is positioned relative to the disc brake 20 such that air flows over the one or more discs 21,22, through filter 30 and away from the assembly 1, wherein the filter 30 is configured to separate and remove at least part of the brake dust from the air and while allowing the air to pass.

15 Claims, 3 Drawing Sheets

AIRCRAFT LANDING GEAR ASSEMBLY

RELATED APPLICATION

This application incorporates by reference in its entirety and claims priority to United Kingdom patent application GB 2202151.3, filed Feb. 17, 2022.

TECHNICAL FIELD

The present disclosure relates to an aircraft landing gear assembly. More particularly, but not exclusively, this invention concerns an aircraft landing gear assembly comprising a filter that captures brake dust while allowing air to pass through. The invention also concerns an aircraft comprising the aircraft landing gear assembly, and a method of collecting brake dust formed from a disc brake of an aircraft landing gear assembly during a braking event.

An aircraft landing gear assembly typically comprises a wheel and a braking system for use during a braking event. The braking system may comprise a disc brake. The disc brake is operable to resist rotation of the wheel during the braking event. The disc brake comprises a multiplicity of discs, which may be said to form (at least in part) a brake pack. Typically, the multiplicity of discs comprise two types of disc; a rotor disc which rotates with the wheel; and a stator disc which does not rotate with the wheel. The brake pack therefore comprises one or more rotor discs and one or more stator discs. Rotation of the rotor disc(s), and therefore the wheel, is inhibited by squeezing the discs of the brake pack together, which generates friction between the discs during the braking event. The friction between the discs causes material (particulate matter) to be eroded from the discs as a result of the braking event. Material that is eroded from a disc during a braking event may be referred to as brake dust. Over time, brake wear, resulting from repeated braking events, can lead to replacement of the discs in order to maintain a high performance of the disc brake.

Brake dust, formed during braking events due to erosion of the disc(s), can be deposited on parts of the aircraft landing gear assembly, such as the wheel and/or disc brake. Brake dust can be visually obtrusive.

The present invention seeks to mitigate the above-mentioned problems. Alternatively, or additionally, the present invention seeks to provide an improved aircraft landing gear assembly and/or improved method of operating one or more disc brakes of an aircraft landing gear assembly during a braking event.

SUMMARY OF THE INVENTION

The present invention provides, according to a first aspect, an aircraft landing gear assembly. The assembly may comprise a wheel. The assembly may comprise a disc brake comprising one or more discs. The disc brake may be operable to inhibit rotation of the wheel during a braking event thereby resulting in the formation of brake dust from the one or more discs. The assembly may comprise a filter. The filter may be positioned relative to the disc brake such that air flows over the one or more discs, through the filter and away from the aircraft landing gear assembly, for example to the surrounding environment. The filter may be configured to separate and remove at least part of the brake dust from the air while allowing the air to pass through the filter.

Aircraft landing gear assemblies, in accordance with the present invention, may inhibit airborne brake dust from escaping the assembly by using a filter positioned to capture the brake dust while allowing the air to flow away from the landing gear. Such assemblies may reduce the amount of brake dust released to the environment and/or may provide for improved disposal of the brake dust. Additionally, or alternatively, such assemblies may allow for the capture of brake dust while maintaining air flow over the disc brake, such airflow being important for cooling of the brake.

Brake dust may be defined as material that is eroded from the disc(s) during braking event(s), for example, particulate matter that is eroded from the one or more discs. Such particulate matter may agglomerate such that brake dust comprises particles of different sizes. For a given brake material there will be a known distribution of differently sized particles in the brake dust. The filter may be configured to separate particles lying between the fifth and ninety-fifth percentile in the size distribution. The filter may be configured to separate particles lying above the fifth, twenty-fifth or fiftieth percentile in the size distribution. It will be appreciated that references to the filter separating and removing at least part of the brake dust refer to the filter being configured to separate and remove a substantial proportion of the brake dust from the airstream, for example the majority of the brake dust from the airstream. The assembly may be arranged such that air, for example from the surrounding environment (e.g. from the exterior of the landing gear assembly and/or aircraft), flows over the disc brake and then through the filter and away from the landing gear assembly, for example back to the surrounding environment (e.g. to the exterior of the landing gear assembly and/or aircraft).

The disc brake may comprise a plurality of discs. The disc brake may comprise one or more stator discs. Each stator disc may be mounted on the assembly such that the stator disc does not rotate with the wheel. The disc brake may comprise one or more rotor discs. Each rotor disc may be mounted on the assembly, for example on the wheel and/or axle, so that the rotor disc rotates with the wheel. The disc brake may comprise a brake pack having one or more rotor discs and one or more stator discs. Each rotor disc may be adjacent to a stator disc, so that the rotor disc(s) and stator disc(s) are arranged in an alternating pattern along the longitudinal axis of the brake pack and/or disc brake. The disc brake may comprise one or more actuators for urging the rotor disc(s) and stator disc(s) into contact with one another, thereby engaging the disc brake.

Each of the one or more discs (e.g. each rotor disc or stator disc) may be a carbon disc. For example, a disc comprising carbon fibres in a matrix. Examples of carbon discs include carbon-carbon discs and carbon-silicon carbide discs. A carbon-carbon disc comprises a plurality of carbon fibres in a graphite matrix. A carbon-silicon carbide disc comprises a plurality of carbon fibres in a silicon carbide matrix. The carbon disc may be a disc manufactured from fibres, for example, preformed nonwoven fibres, which are carbonized by driving off non-carbon components under a process comprising heat treatment, resulting in a solid disc.

The brake dust may comprise, principally comprise and/or essentially consist of, particles having a size, for example, less than or equal to 50 microns, for example from about 0.05 microns to about 50 microns, for example, from about 0.1 microns to about 10 microns. The brake dust formed from a carbon disc may comprise, principally comprise and/or essentially consist of carbon dust.

The aircraft landing gear assembly may comprise a forced convection device, for example a fan, arranged to drive the flow of air over the one or more discs and through the filter.

The forced convection device may comprise an impeller. The impeller may comprise one or more vanes (or blades). The forced convection device may comprise a motor configured to drive the impeller. The motor may be an electric motor. The forced convection device may comprise an output shaft from the motor. The output shaft may be rotatable about an axis of the output shaft. The one or more vanes may be radially extending from the output shaft of the motor and rotatable about an axis of the output shaft. Use of a forced convention device may increase the amount of dust entrained in the airflow and thereby captured by the filter.

The aircraft landing gear assembly may comprise a debris guard configured to inhibit passage of debris through the debris guard. The debris guard may be configured to inhibit passage of debris having a size that is greater than a size of the brake dust. For example, the debris may have a size that is greater than or equal to 1 mm. The debris guard may be configured to inhibit passage of debris having a size that is greater than or equal to 5 mm, for example greater than or equal to 10 mm. The debris guard may be configured to inhibit passage of debris having a size that is between about 5 mm and about 25 mm. The debris guard may be configured to inhibit passage of debris having a size that is between about 5 mm and about 10 mm. The debris guard may be configured to inhibit passage of debris having a size falling in the ranges given above, while allowing smaller particles, for example brake dust, and air to pass through.

The debris guard may comprise a debris grating. The debris grating may be mounted on a grating carrier. The grating carrier may be mounted on the wheel, for example the tubewell, web, or hub of the wheel (see below), and/or an axle of the wheel. The grating carrier may comprise an outer portion and an inner portion, the outer portion being located radially outside the inner portion. The debris grating may be located between the outer portion and the inner portion of the grating carrier. The debris grating and/or grating carrier may extend circumferentially around a portion of the tubewell, web, or hub, the forced convection device and/or at least a portion of the axle of the wheel. The grating carrier may shroud a space downstream of the disc brake and/or upstream of the forced convection device.

The debris grating may provide one or more apertures through which air can flow. The debris grating may be configured to prevent the passage of debris having a size greater than or equal to 1 mm. The aperture(s) may be large enough to allow brake dust to pass through and/or air to pass through but small enough to impede the passage of debris. The aperture(s) may be configured to prevent ground personnel from putting their fingers through the debris guard. The aperture(s) may have a minimum dimension of at least 5 mm, for example at least 10 mm. The aperture may be between 5 mm and 10 mm in size. The size of the aperture(s) may be a width and/or a length. The aperture(s) may be circular or annular. The aperture(s) may be elongate.

The filter may be configured to remove particles of brake dust (particulate matter) from the air, said particles having a size less than or equal to 50 microns, for example from about 0.05 microns to about 50 microns, for example from about 0.1 to about 10 microns.

The filter may be configured to retain at least part of the brake dust removed from the air. The filter may comprise a filtration material to separate and remove at least part of the brake dust from the air. The filter may comprise a filtration carrier upon which the filtration material is mounted. The filter, for example, the filtration carrier, may be mounted on the wheel, for example directly or indirectly via the debris guard. The filter may be mounted on the debris guard. The filtration carrier may be mounted on the grating carrier. In some embodiments, the filtration carrier may be absent, and the filtration material may be mounted directly on the debris guard, for example on the grating carrier and/or debris grating. The filtration material may be a porous material through which air can pass but brake dust cannot. The porous material may be configured to retain brake dust while allowing air to pass through. The porous material may comprise a mesh. The mesh may comprise interconnected strands between which are apertures through which air can pass. The mesh may comprise wire. The mesh may be configured to provide a barrier to brake dust. Beneficially, the filtration material captures the brake dust while still allowing a sufficient flow of air over the disc brake and away from the landing gear (for example to the surrounding environment) such that heat can be taken away from the disc brake when the one or more discs require cooling.

The filter may be located downstream of the debris guard. The filter and debris guard may be concentric. The filter and debris guard may be coaxial with the rotational axis of the wheel (the wheel axis), disc brake, and/or the forced convection device. The filter, debris guard (if present), and disc brake may be arranged along the axis of rotation of the wheel. The debris guard may be located between the filter and the disc brake along said axis. The filter, for example the filtration material, may be located coaxially and/or concentrically with the debris guard and/or the debris grating, for example along the axis of rotation of the wheel. The filtration material may cover (e.g., extend over) a portion of the debris guard, for example over a portion of the debris grating and/or grating carrier. The filtration material and/or the debris guard may be located coaxially and/or concentrically with the wheel and/or the disc brake.

In shape, the filtration material and/or debris grating may be a full or partial annulus. The filtration carrier (if present) may extend radially inward and outward from the filtration material. The grating carrier may extend radially inward and outward from the debris grating. The filter, for example the filtration material, and/or debris guard may extend around a portion of the outer circumference of the tubewell, web, hub, axle, forced convection device and/or disc brake.

The wheel may comprise a rim to which a tyre is attached. The wheel may comprise a hub that connects the wheel to the axle of the landing gear assembly. The hub may comprise one or more bearings via which the wheel is mounted on the axle. The wheel may comprise a web extending radially from the hub to towards the rim. The wheel may comprise a tubewell, the tubewell being the cylindrical surface of the wheel. It may be that the web extends between the hub and the tubewell. The wheel, for example the web, may comprise one or more apertures through which air can pass. The apertures may be through holes provided in the web. The web may comprise a substantially planar body extending between the hub and the tubewell having one or more through-holes. The web and/or hub may be located upstream of the filter and/or debris guard relative to the disc brake. The disc brake may be located on the other side of the web and/or hub to the filter and debris guard (if present). The filter and/or debris guard, for example the filter carrier and/or grating carrier may be mounted on the tubewell, web and/or hub. The wheel may be mounted for rotation about a wheel axis.

A notional space may be defined within the rim and extend inboard parallel to the axis of rotation of the wheel from the outboard edge of a tyre mounted on the rim. The notional space may extend inboard from the outboard edge of the tyre to the outboard side of the web and/or hub. The filter may be located within said notional space. The debris guard may be located within said notional space. The filter and debris guard (if present) may extend across the whole of the surface area of said notional space, such that air passing through the notional space must pass through the filter and/or debris guard. The outboard edge or side may be the opposite side of the wheel to the disc brake and/or disc(s). Thus, the disc(s) may be on a first, inboard side, of the wheel and the filter and debris guard (if present) may be on a second, outboard side, of the wheel.

The filter may be positioned downstream of the forced convection device (if present). The forced convention device may be located upstream of the debris guard (if present) and the filter. In this way, the forced convention device may be contained within the debris guard, to prevent damage in the event of a malfunction of the forced convention device. The forced convection device may be located on the outboard side of the wheel.

The filter may be independently removable from the assembly with respect to the debris guard. This may facilitate inspection and maintenance. The aircraft landing gear assembly may comprise an attachment device to couple the filter to the rest of the assembly, for example to couple the filtration carrier to the grating carrier. The attachment device may comprise a quick-release mechanism. This enables the filtration material to be removed for inspection and/or replacement.

The aircraft landing gear assembly may comprise a collector to collect the brake dust detached from the filter. The brake dust may be detached from the filter as a result of shock and/or vibration of the assembly caused by movement of an aircraft comprising the assembly. The brake dust may be detached from the filter as a result of gravitational and/or rotational forces. The collector may be defined, at least in part or wholly, by the filter and/or debris guard. For example the filter carrier and/or grating carrier may define (at least in part) a void in which dust can accumulate, said void forming the collector. The collector may have substantially the same position as the filter material along the axis of rotation of the wheel (the wheel axis). The collector may be radially adjacent to the filter material, for example the collector may be located radially outside the filter material. The collector may comprise a depression in a surface of the assembly, for example the surface of the filter carrier and/or grating carrier. The depression may be a groove or channel in a surface of the carrier. The groove or channel may extend circumferentially around a portion of a circumference of the filtration material. The surface of the filtration carrier and/or grating carrier in which the groove or channel is formed may be an inward facing surface (e.g. a surface the normal of which face towards the axis of the wheel). Capturing brake dust in a collector may facilitate its removal from the landing gear assembly and/or reduce the tendency of brake dust to re-circulate within the assembly.

The assembly may comprise an axle on which the wheel is mounted. The assembly may be provided with more than one wheel. For example, the assembly may comprise two (and optionally only two) wheels. The assembly may comprise four (and optionally only four) wheels.

It will be appreciated that the term "downstream" and "upstream" as used herein refer to a relative position along the flowpath of the air after it passes over the disc brake. For example, if after passing over the disc brake air flows over a first element and then a second element, the first element may be said to be upstream of the second element and the second element may be said to be downstream of the first element.

According to a second aspect of the invention there is also provided an aircraft comprising the aircraft landing gear assembly according the first aspect or any other aspect.

The aircraft may be a commercial passenger aircraft, for example an aircraft configurable to carry more than fifty passengers, for example more than one hundred passengers. It may be that the aircraft is a fixed wing aircraft. It may be that the landing gear is a wing mounted landing gear (i.e., mounted wholly or partially to a wing of the aircraft), a fuselage mounted landing gear (i.e. mounted wholly or partially to the fuselage of the aircraft) and/or a nose landing gear (e.g. a steerable landing gear). It may be that the landing gear is a retractable landing gear.

The aircraft may comprise first and second aircraft landing gear assemblies of the first aspect of the present invention, the first aircraft landing gear assembly being located on the port side of the aircraft and the second aircraft landing gear assembly being located on the starboard side of the aircraft. Those skilled in the art will realise that certain larger aircraft may be provided with further landing gear assembly in addition to the first and second aircraft landing gear assemblies.

According to a third aspect of the invention there is provided a method of collecting brake dust. It may be that an air stream passes over a disc brake of an aircraft landing gear. After passing over the disc brake, the air stream may pass through a filter and away from the aircraft landing gear, for example back to the surrounding environment. The brake dust may be formed from the disc brake during a braking event. The brake dust may be entrained by the air stream. The brake dust may be carried by the air stream to the filter. It may be that at least part of the brake dust is separated and removed by the filter as the air stream passes through the filter. It may be that the air stream is a stream of air from the surrounding environment (e.g. the exterior of the landing gear assembly and/or aircraft) that passes over the disc brake and through the filter and then returns to the surrounding environment.

It may be that at least part of the brake dust separated and removed from the air stream by the filter becomes detached from the filter. Said brake dust that has become detached from the filter may be collected in a collection region (or collector) spaced apart from the filter.

It may be that at least part of the brake dust that is separated and removed from the air stream is retained by the filter as the air stream passes through the filter. It may be that the filter comprises a filtration material, for example a porous material, and at least part of the brake dust is retained by the filtration material as the air stream passes through the filtration material.

It may be that an air stream is driven through the filter and/or over the disc brake by a forced convection device, for example before, during and/or after a braking event. The method may comprise operating the forced convention device before, during and/or after a braking event. Alternatively, it may be that the method does not involve a forced convention device and air flows over the disc brake and through the filter as a result of the movement of the aircraft through the air.

It may be that the aircraft landing gear is part of an aircraft and the air stream is driven by the forced convection device when the aircraft is stationary. The forced convection device may be operated when the aircraft is moving, for example on the ground (when the aircraft is taxiing) and/or in-flight. It may be that the forced convection device is activated by a controller in response to detection of a predetermined ground speed of the aircraft. It may be that the forced convection device is deactivated by the controller in response to detection of a predetermined temperature of the disc brake. It may be that the forced convection device is activated and/or deactivated in response to an input by a member of the flight crew or ground personnel.

The filter may be configured to separate and remove at least part of the brake dust while allowing air to pass through such that the pressure drop across the filter is less than or equal to 100 Pa. In this way, brake dust is collected without significantly impacting on air flow over the brake pack.

According to a fourth aspect, an aircraft landing gear assembly is provided. The assembly may comprise a wheel that rotates about a wheel axis. The assembly may comprise a disc brake comprising at least one disc and operable to decelerate the wheel. The assembly may comprise a filter spaced apart from the disc brake along said wheel axis. It may be that the filter is configured to capture particulate matter having a size less than or equal to 50 microns, said particular matter being material that is eroded from the at least one disc during a braking event and is airborne and carried from the at least one disc by a flow of air passing through the filter and away from the aircraft wheel braking system. It may be that the at least one disc is located on an inboard side of the wheel and the filter is located on an outboard side of the wheel. It may be that the inboard side and outboard side are on opposite sides of the wheel, along the wheel axis.

It will of course be appreciated that features described in relation to one aspect of the present invention may be incorporated into other aspects of the present invention. For example, the method of the invention may incorporate any of the features described with reference to the apparatus of the invention and vice versa. For example, any feature of the aircraft landing gear assembly according to the first aspect may be provided in addition to, or alternative to, any feature of the aircraft landing gear assembly according to the fourth aspect.

DESCRIPTION OF THE DRAWINGS

Embodiments of the present invention will now be described by way of example only with reference to the accompanying schematic drawings of which.

DETAILED DESCRIPTION

Figure 1:
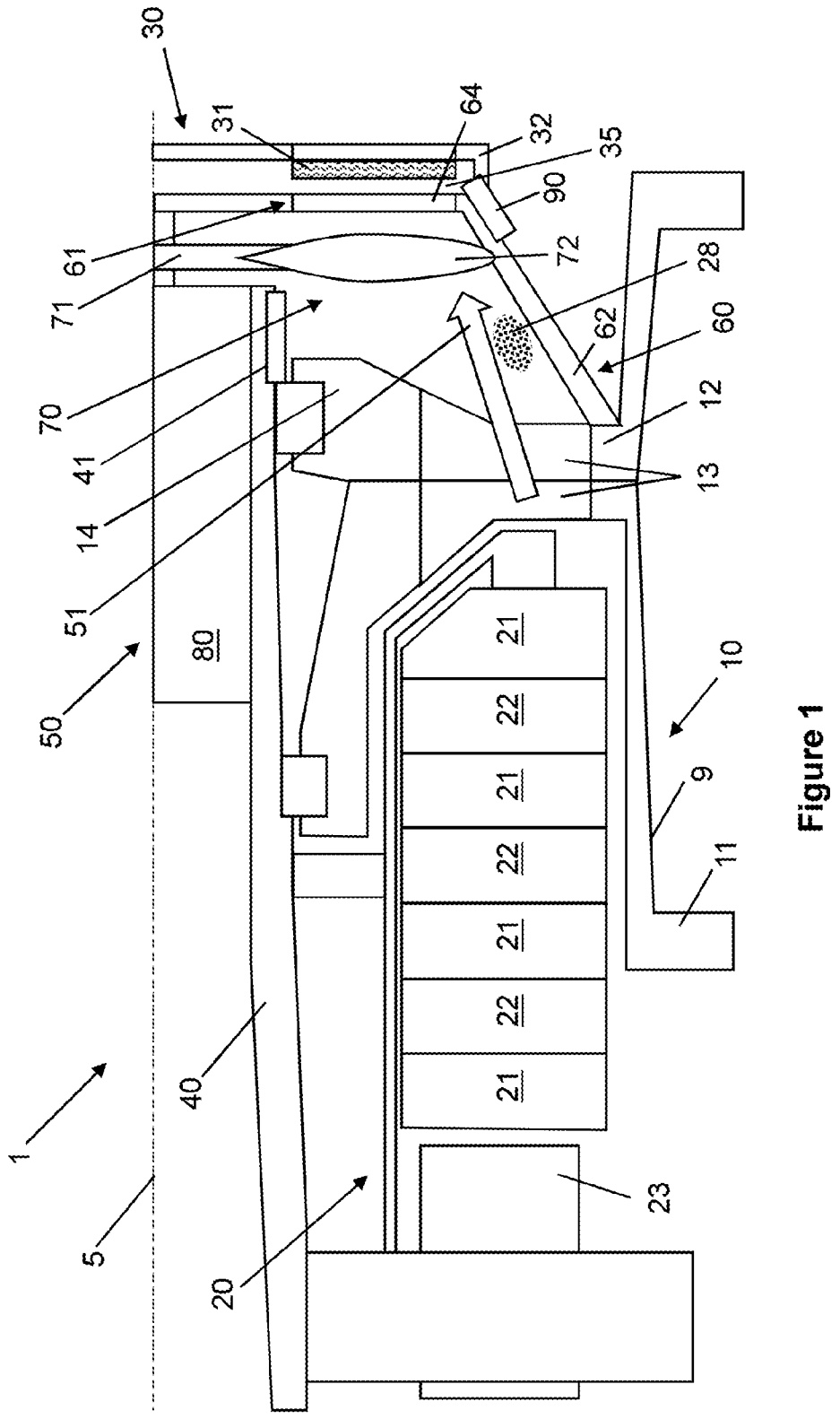
FIG. 1 shows a schematic cross-sectional view of a landing gear assembly according to a first embodiment of the invention.

FIG. 1 shows a schematic cross-sectional view of a landing gear assembly 1 for an aircraft according to a first embodiment. The cross-sectional view represents one side of the assembly 1 with respect to a common axis (labelled 5 and shown with a dashed line in FIG. 1) of the assembly 1. The assembly 1 is substantially symmetrical about the common axis 5.

The assembly 1 comprises a wheel 10 (only part of which is shown in FIG. 1), a disc brake 20 located inboard of the wheel 10 (toward the bottom of FIG. 1) along the common axis 5, and a filter 30 mounted on the outboard side of the wheel 10 along the common axis 5. The wheel 10 is mounted on an axle 40. The common axis 5 is the longitudinal centre of the axle 40 about which the wheel 10 rotates. The wheel 10 comprises a rim 11, a tubewell 9, a web 12, and a hub 14, that are each arranged in that order towards a centre of the wheel 10 corresponding to the common axis 5. The rim 11 is the outer edge of the wheel 10 and is configured to hold a tyre (not shown). The wheel structure extending between edges of the rim 11 is the tubewell 9. The web 12 is a portion of the wheel 10 between the tubewell 9 and the hub 14. The hub 14 is a portion of the wheel 10 that is closer to the axle 40 than the rim 11, tubewell 9, and web 12. The wheel 10 comprises vent holes 13 in the web 12 to allow air to pass through the wheel 10. The vent holes 13 are provided in the web at different circumferential locations around, and spaced apart radially from, the axle 40 and hub 14. The vent holes are through-holes, extending through the thickness of the web, such that the longitudinal axis of each hole is substantially parallel to the axis of rotation of the wheel 10. The vent holes 13 help direct the flow of air from the disc brake 20 towards the fan 50 and filter 30. The vent holes 13 are configured to be large enough for a substantial volume of air to flow through them. It will be appreciated that in other embodiments the configuration of the wheel and/or web may differ, such that the vent holes take a different form and/or the air can flow from the disc brake to the filter via another route, such that the vent holes may be absent.

The disc brake 20 comprises a multiplicity of discs 21, 22 that form a brake stack. The multiplicity of discs 21, 22 comprises two types of disc: a stator disc 21; and a rotor disc 22. Each stator disc 21 is to inhibit rotation of one or more rotor discs 22. The brake stack is aligned on the common axis 5 such that the discs 21, 22 are coaxial and concentric with the common axis 5. In this embodiment, the discs 21, 22 are carbon discs. Each carbon disc 21, 22 comprises carbon fibre material in its construction. In this embodiment, four stator discs 21 are shown that act on three rotor discs 22, but it will be appreciated that different numbers of stator discs and rotor discs may be present in the brake stack, for example, in other embodiments, the disc brake 20 may comprise a single rotor disc 22 or two or more than three rotor discs 22. Each rotor disc 22 rotates with the wheel 10. Each rotor disc 22 is configured to rotate about the common axis 5 with the wheel 10, such that friction applied to brake the rotor disc 22 during a braking event causes the wheel 10 to decelerate. The disc brake 20 also comprises an actuator 23 to urge the discs 21, 22 into contact with one another, thereby engaging the disc brake 20 and slowing rotation of the wheel 10. Disc brakes of this type are well known to the skilled person and will not be described in detail here.

The assembly 1 comprises a brake cooling fan 50 configured to cool the disc brake 20. The fan 50 comprises an impeller 70 and a motor 80 to drive the impeller. The motor is mounted concentrically within axle 40, at the outboard end 41 of the axle 40 (the top of FIG. 1). The impeller 70 comprises a disc 71 located outboard of the end of axle 40 and vanes 72 extending radially outwardly from the disc 71. The fan 50 is configured to be powered by an electrical power source (not shown) that supplies electrical energy to the motor 80.

The assembly 1 comprises a debris guard 60 mounted on the outboard side of web 12. The debris guard 60 is located downstream of the web 12, but upstream of the filter 30, with respect to a flow of air from the disc brake 20. The debris guard 60 comprises a debris grating 61 mounted on the web 12 via a grating carrier 62. In the present embodiment, the debris guard 60 is symmetrical about the common axis 5, with the debris grating 61 having an annular shape and being supported by the grating carrier 62, a portion of which extends radially inward from the debris grating 61 and a portion of which extends radially outward from the debris grating 61 to the web 12. However, it will be appreciated that the debris guard may take various forms. The debris grating 61 defines a series of apertures 64. In FIG. 1, only one aperture 64 is shown. In this embodiment, the apertures 64 of the debris grating 61 are around 10 mm in size. In other embodiments, the apertures 64 may be smaller or larger than 10 mm in size. For example, the apertures 64 may be in the order of finger size (from approximately 5 mm to approximately 25 mm).

The filter 30 is located downstream of the fan 50, and debris guard 60, with respect to the flow of the air from the disc brake 20. The filter 30 is coaxial with and symmetrical about the common axis 5.

The filter 30 comprises a filtration material 31 mounted on a filtration carrier 32 which is in turn mounted on the grating carrier 62. The filtration material 31 is porous. In some embodiments the filtration carrier 32 may be absent, with the filtration material 31 mounted directly on the debris guard 60, for example on the grating carrier 62. In the present embodiment, the filter 30 is symmetrical about the common axis 5, with the filtration material 31 having an annular shape and being supported by the filtration carrier 32, a portion of which extends radially inward from the filtration material 31 and a portion of which extends radially outward from the filtration material to the grating carrier 62. However, it will be appreciated that the filter 30 may take various forms.

The filter 30 is indirectly mounted to the web 12 of the wheel 10 via the debris guard 60. In other embodiments, the filtration carrier 32 may be directly mounted to the wheel 10. The filtration carrier 32 is connected to the grating carrier 62 by an attachment device 90. The attachment device 90 comprises a quick-release mechanism to allow the filtration carrier 32 to couple to and decouple from the grating carrier 62. This enables the filter 30 to be removed for inspection and/or replacement.

A void 35 is defined between the filtration carrier 32 and grating carrier 62 at the point where the filtration carrier 32 is connected to the grating carrier 62 (radially outboard of filtration material 31).

In use, during a braking event the friction between the discs 21, 22 causes material (particulate matter) to erode from the discs 21, 22. This material that is eroded from the discs 21, 22 during the braking event is referred to as brake dust 28. Typically, brake dust 28 comprises particles with an individual or accumulated average size (for example, diameter) in a range of approximately 0.1 microns to approximately 10 microns. During or following the braking event, the brake dust 28 becomes airborne and entrained in an air stream that flows over the disc brake 20, through the debris guard 60 and then through the filter 30 and away from the assembly 1 to the surrounding environment. The filter 30 separates and removes at least part of the brake dust 28 entrained in the air while allowing the air to pass through the filter 30. Thus, assemblies in accordance with the present example embodiment reduce the amount of brake dust released to the environment.

In the present embodiment, the flow of air over the disc brake 20, through the debris guard 60 and filter 30 is driven by the fan 50. The fan 50 draws cool air over the discs 22 and forcibly cools the disc brake 20, thereby assisting in controlling the temperature of the disc brake 20. In doing so, the fan 50 produces an air flow that may agitate brake dust

28 produced from a previous braking event, and/or gather brake dust 28 from a current or recent braking event that falls from the disc brake 20 and would otherwise be deposited and accumulate on surfaces of the assembly 1. The fan 50 therefore assists in the removal of the brake dust 28 from surfaces of the assembly 1.

In this embodiment, a shroud is formed from the debris guard 60 and the filter 30. The shroud extends across the whole of the downstream side of the hub 14, so that after passing over the disc brake 20, air must flow through the filtration material 31 before moving away from the landing gear.

In use, the debris guard 60 retains debris (not shown in FIG. 1) that may exit the assembly 1 due to damage of the impeller 70 and/or other parts of the assembly 1 and prevents ingress of debris into the disc brake 20 from the outboard side of the web 12. The apertures 64 of the debris grating 61 are each large enough to allow brake dust 28 to pass through but small enough to impede the passage of debris. Debris comprises loose material that is greater in size than brake dust 28. In this embodiment, the apertures 64 of the debris guard 60 are configured to inhibit passage of debris through the debris guard 60 having a size that is greater than or equal to 10 mm. It will be appreciated that in other embodiments, the debris guard may be absent.

Although brake dust 28 can be captured by the filtration material 31, it may also accumulate in void 35 when it falls from the filter (for example due to vibration or circumferential force). Thus, void 35 may be referred to as a collector. Providing a collector such as void 35 may assist in limiting the spread of brake dust within the brake assembly and facilitate controlled removal of the brake dust.

Figure 2:
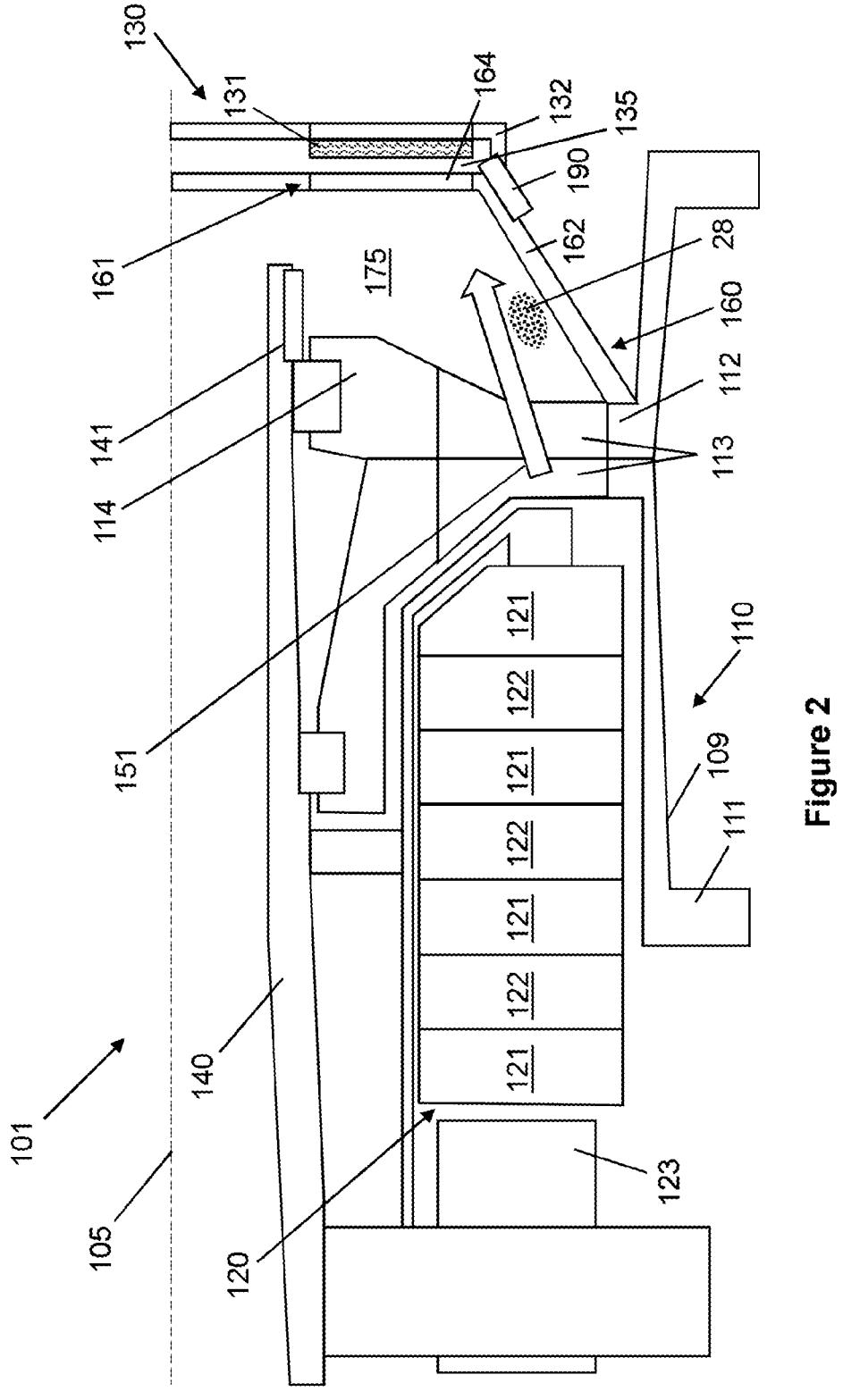
FIG. 2 shows a schematic cross-sectional view of a landing gear assembly according to a second embodiment of the invention.

FIG. 2 shows a schematic cross-sectional view of a landing gear assembly 101 according to a second embodiment. The cross-sectional view of FIG. 2 is of the same type as the cross-sectional view of FIG. 1 in that only one side of the aircraft landing gear assembly 101 with respect to a common axis 105 of the assembly 101 is shown. The other side of the assembly 101 with respect to a common axis 105 is generally a mirror image of the side of the assembly 101 that is shown in FIG. 2. Common features between the first and second embodiments are incremented by 100 in FIG. 2. Only the differences between the first and second embodiments are discussed below.

The assembly 101 does not comprise a forced convention device, such as the brake cooling fan 50 that is part of the first embodiment shown in FIG. 1. Instead, air is naturally drawn through the assembly 101 in a left-to-right direction of FIG. 2, as indicated by arrow 151, and is sent to the filter 130. The air flow through the filter 130 may be formed due to a rotation of the wheel 110 during taxiing of the aircraft and/or by natural convection of the air within the assembly 101.

Figure 3:
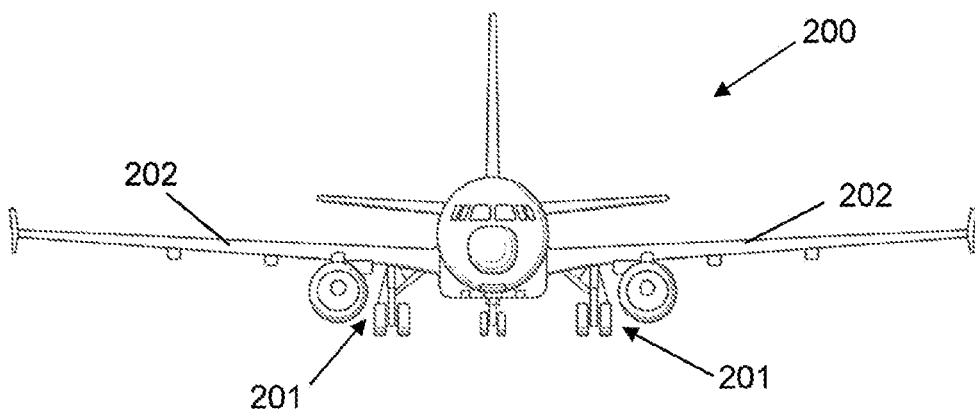
FIG. 3 shows a front view of an aircraft according to a third embodiment of the invention.

FIG. 3 shows an aircraft 200 having two wings 202, each wing having a landing gear 201 mounted thereon. While FIG. 3 shows landing gear 201 mounted on the wing 202, in other embodiments the landing gear may be a nose landing gear or may be mounted on the fuselage of the aircraft 200. Each landing gear 201 of FIG. 3 may comprise the landing gear assembly 1, 101 according to the first or second embodiments. The aircraft 200 of FIG. 3 may comprise a power source for driving the fan 50, according to the landing gear assembly 1 of the first embodiment, or be capable of generating electrical power to the fan 50.

Figure 4:
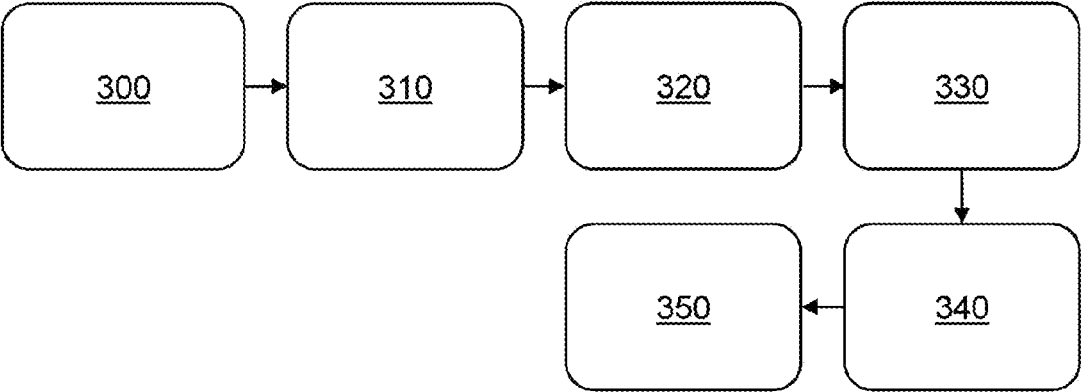
FIG. 4 shows an example method in accordance with the invention.

FIG. 4 shows a method of collecting brake dust, for example using the landing gear assembly 1, 101 according to the first or second embodiments. A braking event 300 causes brake dust to be formed 310 from a disc brake. The brake dust is then entrained 320 in an air stream that passes over the disc brake then through a debris guard, then through a filter and away from the aircraft landing gear to the surrounding environment. As the air stream passes through the filter, at least part of the brake dust is separated and removed 330 from the air stream.

Optionally, at least part of said brake dust separated and removed from the air stream then detaches 340 from the filter and is collected 350 in a collector spaced apart from the filter. Optionally (not shown in FIG. 4) a forced convention device is operated to drive the air stream over the disc. The forced convention device may be operated before, during and/or after the braking event. Periodically, for example when a visual inspection reveals the filter is blocked and/or after a predetermined maintenance interval, the filter is removed and replaced.

Where in the foregoing description, integers or elements are mentioned which have known, obvious or foreseeable equivalents, then such equivalents are herein incorporated as if individually set forth. Reference should be made to the claims for determining the true scope of the present invention, which should be construed to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both, unless the this application states otherwise. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An aircraft landing gear assembly comprising:
   a wheel supporting a tire and including a web and hub assembly extending between the tire and an axel, wherein the web and hub assembly include through-holes;
   a disc brake comprising one or more discs, wherein the disc brake is configured to inhibit rotation of said wheel during a braking event which generates brake dust from the one or more discs; and
   a filter positioned relative to the disc brake and in an air stream flowing over the one or more discs, through the through-holes, through the filter and away from the aircraft landing gear assembly,
   wherein the filter is configured to separate and remove the brake dust from the air steam while allowing air in the airstream to pass through the filter,
   wherein the filter is mounted on the wheel and is concentric to the wheel, and wherein the filter and the disc brake are on opposite sides of the web and hub assembly.

2. The aircraft landing gear assembly according to claim 1, wherein each of the one or more discs is a carbon disc.

3. The aircraft landing gear assembly according to claim 1, further comprising a collector to collect brake dust detached from the filter.

4. The aircraft landing gear assembly according to claim 1, further comprising a forced convection device arranged to drive the flow of the air stream over the one or more discs and through the filter.

5. The aircraft landing gear assembly according to claim 1, wherein the filter comprises a filtration material configured to separate and remove at least part of the brake dust from the air stream and a filtration carrier to carry the filtration material.

6. The aircraft landing gear assembly according to claim 1,
   further comprising a debris guard configured to inhibit passage of debris having a size that is greater than or equal to 1 mm through the debris guard, while allowing particles having a size that is less than 1 mm to pass through.

7. The aircraft landing gear assembly according to claim 6, wherein the filter is positioned in the airstream downstream of the debris guard.

8. The aircraft landing gear assembly according to claim 6, wherein the filter is mounted on the debris guard.

9. The aircraft landing gear assembly according to claim 6, wherein the debris guard, the filter and the wheel are coaxial with and/or substantially symmetrical about an axis of rotation of the wheel.

10. The aircraft landing gear assembly according to claim 1, wherein the filter is configured to remove from the air stream particles of brake dust having a size less than or equal to 50 microns from the air.

11. An aircraft comprising the aircraft landing gear assembly according to claim 1.

12. A method of collecting brake dust comprising:
    passing an air stream over a disc brake adjacent a wheel on an aircraft landing gear,
    as the air stream flows downstream of the disc brake, the air stream passes through a filter and flows away from the aircraft landing gear into an environment surrounding the aircraft landing gear;
    generating brake dust by the disc brake during a braking event, and entraining the brake dust into the air stream passing over the disc brake; and
    capturing the entrained brake dust by the filter as the air stream passes through the filter to separate the brake dust from the air in the airstream flowing away from the aircraft landing gear and into the environment,
    wherein the filter is mounted on the wheel, is concentric to the wheel and rotates with the wheel, and
    wherein the step of the air stream flowing downstream of the disc brake includes the air stream passing through through-holes in the wheel before the air stream reaches the filter which is on a side of the wheel opposite to the disc brake.

13. The method according to claim 12, further comprising detaching from the filter and collecting in a collector spaced from the filter at least a portion of the brake dust captured by the filter.

14. The method according to claim 12, wherein the air stream is driven through the filter and/or over the disc brake by a forced convection device.

15. An aircraft landing gear assembly comprising:

a wheel configured to rotate about a wheel axis;

a disc brake comprising at least one disc and configured to decelerate the wheel during a braking event; and a filter spaced from the disc brake along a direction of said wheel axis, wherein the filter is mounted on the wheel and has a center concentric with the wheel axis, wherein the filter is configured to capture particulate matter having a size no greater than 50 microns that erodes from the disc brake during the braking event, wherein the disc brake is on an inboard side of the wheel and the filter is on an outboard side of the wheel wherein the wheel comprises a web having one or more through-holes, and wherein the through-holes are arranged such that the particulate matter entrained in an airstream flows from the disc brake through the through-holes and to the filter.

* * * * *